July 5, 1955         A. P. SCHOLTZ        2,712,390

MACHINE FOR UNLOADING CANS FROM CARTONS

Filed Feb. 10, 1951                          11 Sheets-Sheet 1

July 5, 1955   A. P. SCHOLTZ   2,712,390
MACHINE FOR UNLOADING CANS FROM CARTONS
Filed Feb. 10, 1951   11 Sheets-Sheet 3

Inventor
Arthur P. Scholtz
By: Morris Spector
Atty.

July 5, 1955  A. P. SCHOLTZ  2,712,390
MACHINE FOR UNLOADING CANS FROM CARTONS
Filed Feb. 10, 1951  11 Sheets-Sheet 9

Inventor
Arthur P. Scholtz
By: Morris Spector atty.

United States Patent Office 2,712,390
Patented July 5, 1955

2,712,390

MACHINE FOR UNLOADING CANS FROM CARTONS

Arthur P. Scholtz, Chicago, Ill., assignor, by mesne assignments, to National Can Corporation, Chicago, Ill., a corporation of Delaware Application February 10, 1951, Serial No. 210,376

15 Claims. (Cl. 214—307)

This invention relates to machines for delivering empty cans to a conveyor, or like means, leading to a canning line.

In the canning industry it has been the usual practice for the canner to receive the empty cans in paperboard cartons each containing forty-eight cans arranged in two tiers or layers, each layer consisting of twenty-four cans arranged six cans in one direction and four cans in the other. Obviously, in such a carton two opposite sides of the carton each face the ends of twenty-four cans, two other opposite sides of the carton each face the cylindrical sides of twelve cans arranged in two rows of six cans each, and the remaining two opposite sides of the carton face the sides of eight cans arranged in two rows of four cans to each row. This last mentioned side is the side of the carton of minimum area. In the fabrication of cartons it is customary for the carton to be so constructed that two opposite sides of the carton are formed by flaps which are in overlapping relationship so that on each of those two sides of the carton the total amount of paper used is greater than the area of those sides of the carton. It is therefore in the interest of economy of paper to construct the carton in such a manner that the overlapping flaps of the carton are located on a side thereof which is of a minimum area. In accordance with the principles of the present invention cartons used are so made that the sides thereof formed by overlapping flaps are those sides which are of a minimum area, namely, the sides that face the eight cans arranged in two rows of four cans each. When an attempt is made to unload empty cans from such a carton by merely permitting the cans to spill from the open end thereof onto a conveyor or the like there is a great likelihood that some of the cans will become twisted in their unloading movement from the carton and, being twisted, will arrive onto the belt or guideway that is to carry them to the canning line in a position other than the position which they should occupy thereon. This may be highly objectionable and is one of the serious problems in the use of such cartons. It is one of the objects of the present invention to provide a machine for facilitating the unloading of cans from an open carton, for instance, one of the above mentioned character, in such a manner as to assure the proper arrangement of the cans when they reach the conveyor belt.

When open ended cans are placed in layers, one can above the other, for future delivery it is possible under some circumstances for adjacent cans to interlock at the flared flange at the open end of the can. Such interlocking may seriously interfere with the orderly dropping of the cans. It is one of the objects of the present invention to provide a machine which may be loaded with a carton full of cans and the carton may then be removed leaving the cans in the machine for future discharge at the will of the operator. It is a further object of the present invention to provide such a machine in which there is assurance that the cans will not interlock.

In accordance with one preferred embodiment of the present invention the machine is provided with two electromagnetic chucks. One of the chucks is swingable between a carton-receiving position and a carton-unloading position. That chuck carries a series of dividing blades that enter between the cans as a can filled carton is moved into place with the open end moving into position to receive the dividing blades. Thereafter that chuck with the dividing blades in place is swung to its unloading position, which is a vertical position, and the carton is removed. A series of holding fingers holds the bottom cans from dropping. There is provided a second chuck which is positioned opposite the loading position of the first chuck, the cans being then held between the two chucks.

In this position the machine is ready to deliver the forty-eight cans upon receiving a signal from the operator. The operator gives this signal by operating an electric switch. This initiates a series of movements that terminate with the discharge of all of the cans from the machine.

In accordance with the principles of the present invention the first action of the machine is the energization of a clutch which starts the machine through its sequence of operation. The last step in the automatic sequence of action is the energization of a limit switch which stops the machine after completion of one revolution.

When the machine is set in operation the two chucks are brought toward one another and are forced tightly against the cans between them. A moment later one of the magnetic chucks is energized to attract and hold its adjacent layer of cans. The two chucks are then separated slightly to allow the other layer of cans to remain limp. This sequence of action, namely, first forcing the two layers of cans together and then permitting one layer of cans to remain limp causes the cans of that second layer to fall into proper position with respect to one another. Thereafter the two chucks are again moved toward one another, magnets on the second chuck are then also energized to attract the previously limp layer of cans, and then the two chucks are again separated somewhat, thus separating the two layers of cans. The layers of cans are now held tightly against the faces of the respective electromagnetic chucks. The holding fingers that held the bottom cans from falling are then moved out of the way. A dividing blade is now moved in between the two layers of cans. At the completion of the inward movement of the dividing blade both magnetic chucks are deenergized. This allows the cans to drop into discharge chutes below. During the dropping movement the dividing blade remains in place to hold the cans from moving helter skelter. The cans roll down into the two discharge chutes. The chutes are so arranged that one passes above the other. In this position the cans of the upper chute are discharged by gravity onto the lower chute from which they are conveyed to the line leading to the processing machines in the normal manner. When the machine has thus completed its cycle the various parts of the machine are brought back to their original position to condition the machine for repetition of the cycle, and the motion is stopped by the automatic disengagement of the clutch.

In using one form of the machine aforesaid the operator places an open-ended carton of empty cans on a suitable receiver therefor, whence the cans are discharged. However, in order to insure that the open ends of the cans, when discharged, shall face in the required direction the carton must be placed in the receiver with the open ends of the cans facing one predetermined direction. For this purpose the operator can glance into the carton and govern himself accordingly. There is nevertheless the chance, owing to human error, that the carton will be placed in the receiver with the open ends of the cans facing in the wrong direction.

Such a mishap may be circumvented by filling the carton with the empty cans arranged so that the open ends of the cans of the two layers face one another, or so that the closed ends face one another, and by providing the machine with means for reversing the cans that come from one of the two layers before discharging the cans from the machine.

The attainment of the above and further objects of the present invention will be apparent from the following specification taken in conjunction with the accompanying drawings forming a part thereof.

In the drawings.

Reference may now be had more particularly to the drawings wherein like reference numerals designate like parts throughout.

The machine shown in the main embodiment illustrated is one adapted to receive a carton of forty-eight cans arranged in two layers of twenty-four cans in each layer, one of the smallest sides of the carton being the side that opens for loading or unloading. The carton is placed on the machine with the open end of the carton sideways, being pushed into position and then swung together with a part of the machine into a position such that the open end of the carton faces downwardly. At this time the cans are supported by two sets of fingers on which the bottom row of cans rest. The carton may then be removed from the machine by lifting it, leaving the cans in the machine. Thereafter the operator may start the sequence of operations of the machine by pushing an electric switch. Once the electric switch is actuated the machine commences to go through its cycle of operations and continues until the cycle is completed, quite independently of whether or not the starting switch is maintained closed. After operation of the starting switch the machine goes through the following cycle of operations: First a clutch-actuating relay is operated which upon operation establishes a locking circuit of its own independently of the manually operated starting switch, and it establishes a circuit for a clutch solenoid that operates a clutch to connect the driving motor to the drive mechanism of the machine. Next the reciprocating chuck is moved inwardly by a spring under control of a cam until the two rows of cans between the chucks are slightly compressed. A moment before the reciprocating chuck completes its inward movement a cam on the machine operates an electric switch to energize the electromagnets of the swinging chuck. At this time the magnets of the reciprocating chuck are not energized. The reciprocating chuck is then caused to recede slightly from the swinging chuck to permit the layer of cans adjacent thereto to become limp and assume a normal position while the opposite layer of cans is magnetically held by the other chuck. The reciprocating chuck then again moves toward the swinging chuck again to compress the layers of cans. The magnets of the reciprocating chuck are then energized. Thereafter the reciprocating chuck recedes slightly from the other chuck, drawing its layer of cans with it, and thus leave a clear space between the two layers of cans. A divider plate then moves into the space between the two layers of cans. At the same time the holding fingers that supported the lowermost cans are swung out of position, the cans being then magnetically held against dropping. At the completion of the inward stroke of the dividing plate a cam trips a limit switch which opens the circuit to the magnets of both chucks, thereby deenergizing the chucks and permitting the cans to drop into the discharge chutes below. The chutes are arranged so that one chute receives the twenty-four cans from one layer and the other chute receives the twenty-four cans from the other layer. The chutes are arranged so that one guides its cans to a position above the other chute and then discharges them into the other chute. That chute then guides the cans to the conveying and processing equipment. The machine then completes its cycle, namely, the dividing plate is retracted to its normal position, the can-holding fingers are swung up to their normal can-holding position, the clutch-actuating relay is deenergized and the clutch between the driving motor and the operating mechanism of the machine is disengaged.

The machine of the present invention is indicated in general by the reference numeral 1. It includes a lower portion 3 which contains the driving motor, speed reducing gearing, clutches, many of the actuating cams, and an upper portion 5 on which is mounted the various parts adapted to receive the cans and arrange them in an orderly manner for the subsequent discharge from the machine. At the front right hand side of the machine there is a loading station 7 and at the front left hand side of the machine there is the electric switch 8 that is manually operated to start the machine through its cycle of motion. The cans discharge from the machine at the back end 9 thereof. While the lower part of the machine is shown as comprising an open frame structure within the confines of which various operating mechanisms are located, it is, of course, understood that the open frame may be suitably closed as desired.

Figure 5:
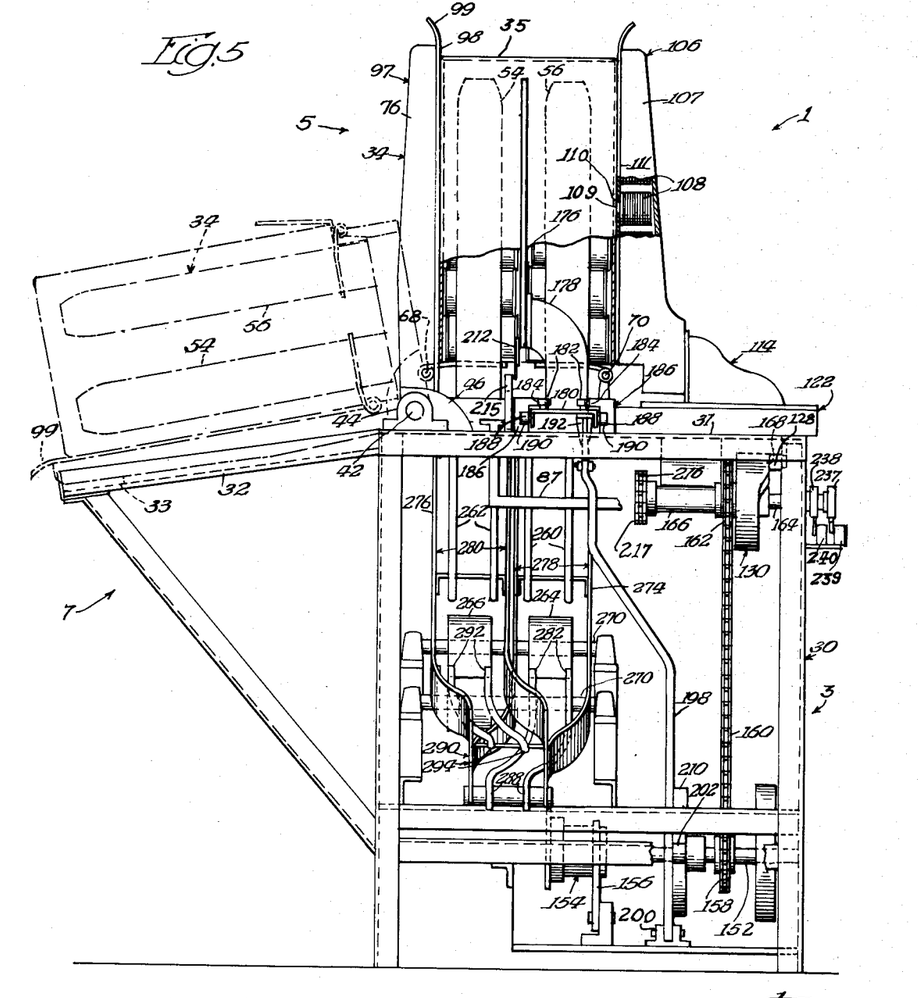
Fig. 5 is a rear elevational view of the machine.
Figures 6, 7, 8:
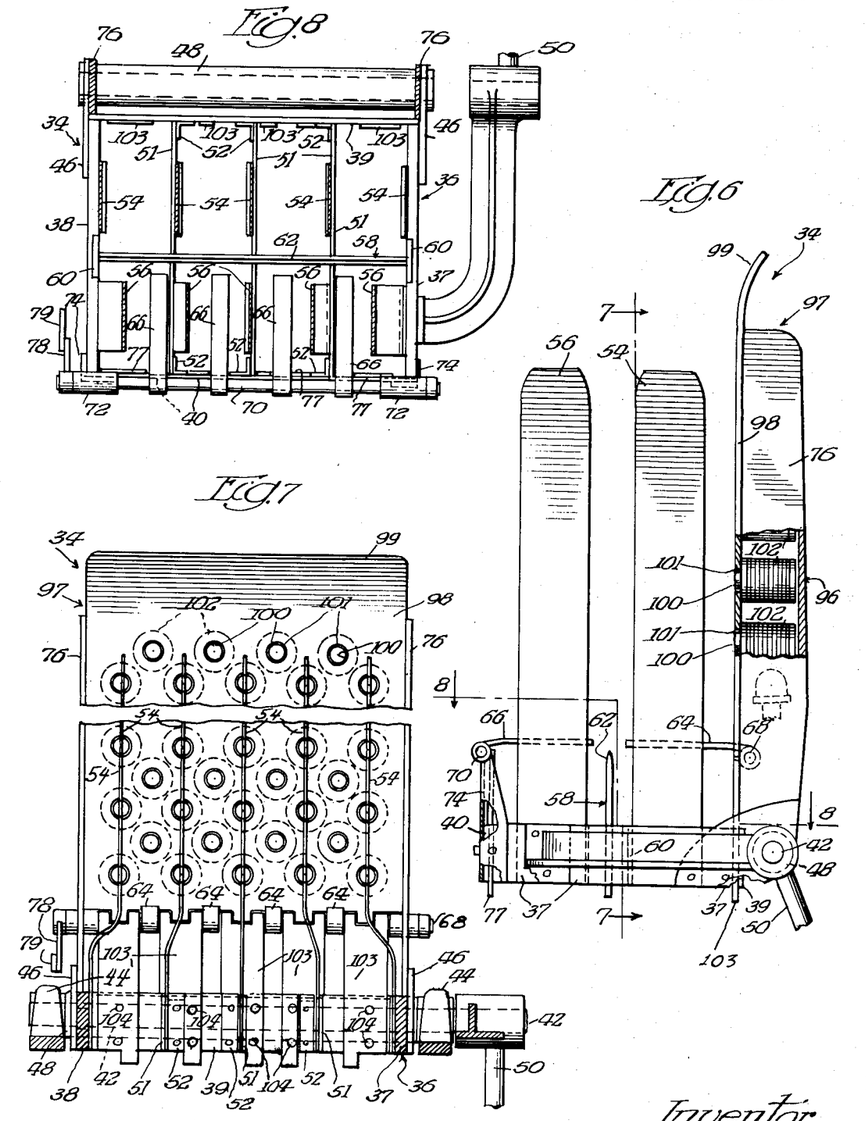
Fig. 6 is a front elevational view of the swinging chuck in vertical (unloading) position.
Figs. 7 and 8 are sectional views taken along the lines 7—7 and 8—8, respectively, of Fig. 6.
Figure 9:
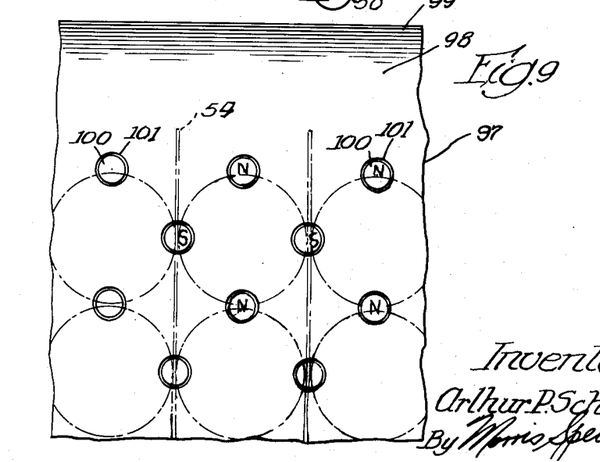
Fig. 9 is an enlarged face view of the magnetic pull face of one of the chucks and the arrangement of cans magnetically held thereby.

There is shown at 30 a supporting stand having a top 31 from whose right side a table or rest 32, having a rubber pad 33, extends. A swinging can-carton receiver or chuck 34 (Figs. 6, 7 and 8) is adapted in one position to incline downward toward and rest on the table pad 33 (Figs. 1 and 5) for receiving the open upper end of an open-ended carton 35 (Figs. 2 and 5) containing two layers of cans as above noted. This receiver includes frame 36 formed of front and rear straps 37 and 38 and right and left side straps 39 and 40 connected thereto. A pivot shaft 42 trunnioned at 44 over the stand 30 passes through ears 46 extending from the frame sides 39 and 40, and through a hub sleeve 48 connected to the ears, whereby the receiver 34 as a unit is swingably supported. The receiver 34 is adapted to be swung between the inclined position above noted and a vertical position, in which it is held by gravity by a counter-weight 49 carried by an arm 50 keyed to the pivot shaft 42, said weight also rendering easy the manual swinging of the receiver from each limiting position to the other. Three spaced bars 51 bridge the space between and are connected at 52 to the frame sides 39 and 40. Two rows of five right and five left can-separating blades 54 and 56 are anchored to the respective frame sides 37 and 38 and bars 51, the lower portions of certain of the blades being somewhat offset (Figs. 7 and 8). The bars 51 extend through slots in a cross bar 58 (Figs. 1, 2, 6 and 8) at right angles to and between the rows of blades 54 and 56 and secured at 60 to the frame sides 37 and 38 and having a can-layer-separating-and-guiding knife-edge 62.

Figure 10:
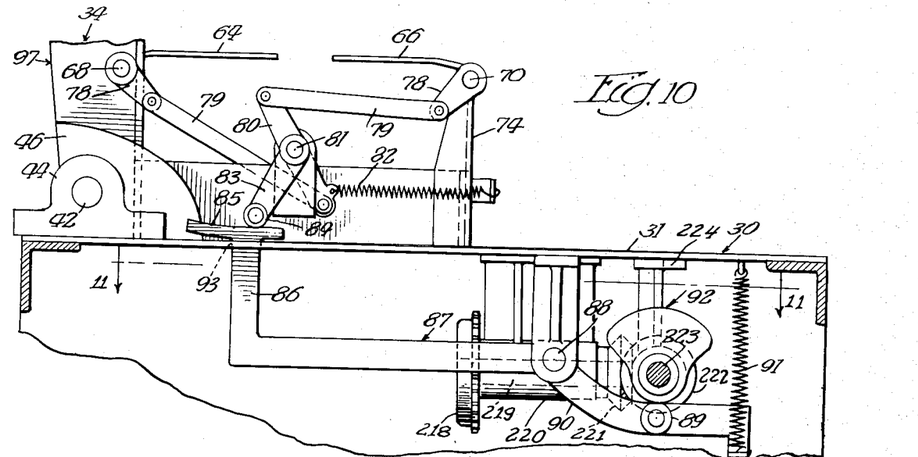
Fig. 10 is a rear elevational view showing the operating linkages for actuating the holding fingers of the swingable chuck.
Figure 11:
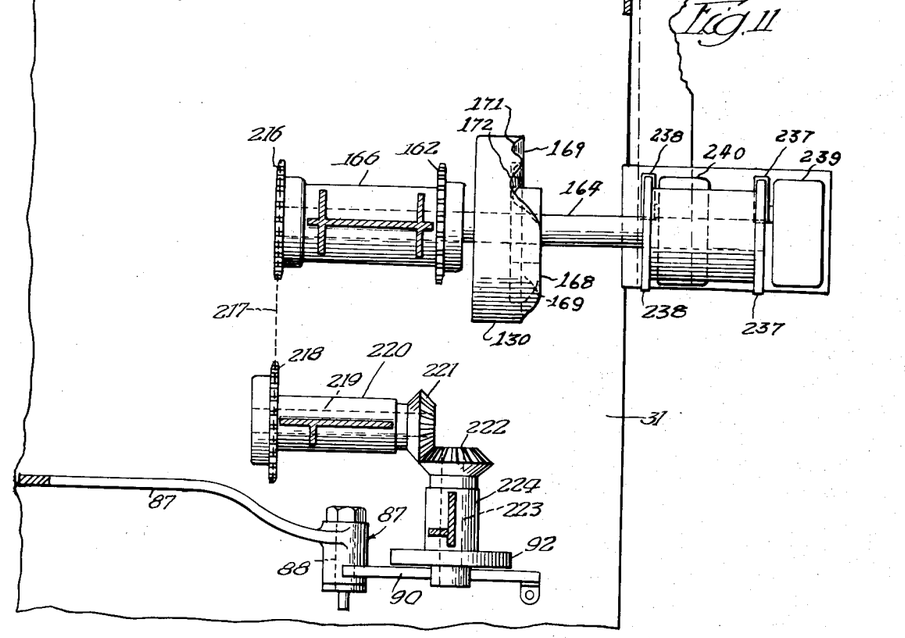
Fig. 11 is a plan view taken along the line 11—11 in Fig. 10.

The swinging chuck 34 also includes two rows of four right and four left detents 64 and 66 alternating with the blades 54 and 56, respectively, and fixed to parallel right and left pivot pins 68 and 70, respectively. The left pivot pin 70 is journaled in bearings 72 carried by angle brackets 74 secured to the corners of the frame 36, and the right pivot pin 68 is journaled in similar bearings carried by front and rear arms 76 fixed to the ears 46. Co-planar plates 77 are secured to the inner face of the frame side 40. Cranks 78—78 fixed to the pivot pins 68 and 70 are provided for turning the detents 64 and 66, and are pivotally connected to links 79—79 (Figs. 7, 8 and 10) in turn pivotally connected to the opposite ends of a lever 80 fulcrummed centrally at 81 and urged in one direction by a spring 82. An arm 83 fixed to the lever 80 carries a roller 84 held by the spring 82 in engagement with an end 85 of an arm 86 of a ball-crank lever 87 fulcrummed at 88 and carrying on its other arm 90 a cam follower roller 89 urged by a spring 91 into engagement with a rotary cam 92 (Figs. 10 and 11). The stand top 31 has a slot 93 through which the lever arm 86 passes.

The arms 76 are parts of the casing 96 of a swinging electro-magnetic chuck 97, said casing including a non-magnetic face plate 98 having a carton-guiding extension 99 and formed with perforations 100 through which project cores terminating flush with the exposed surface of the face plate. The magnets 102 are arranged in rows, the cores of each row being of the same polarity and being of opposite polarity to the cores of the adjacent rows. Plates 103 are secured at 104 to the inner face of the right frame side 39 adjacent and flush with the face plate 98.

Figures 12, 13, 14:
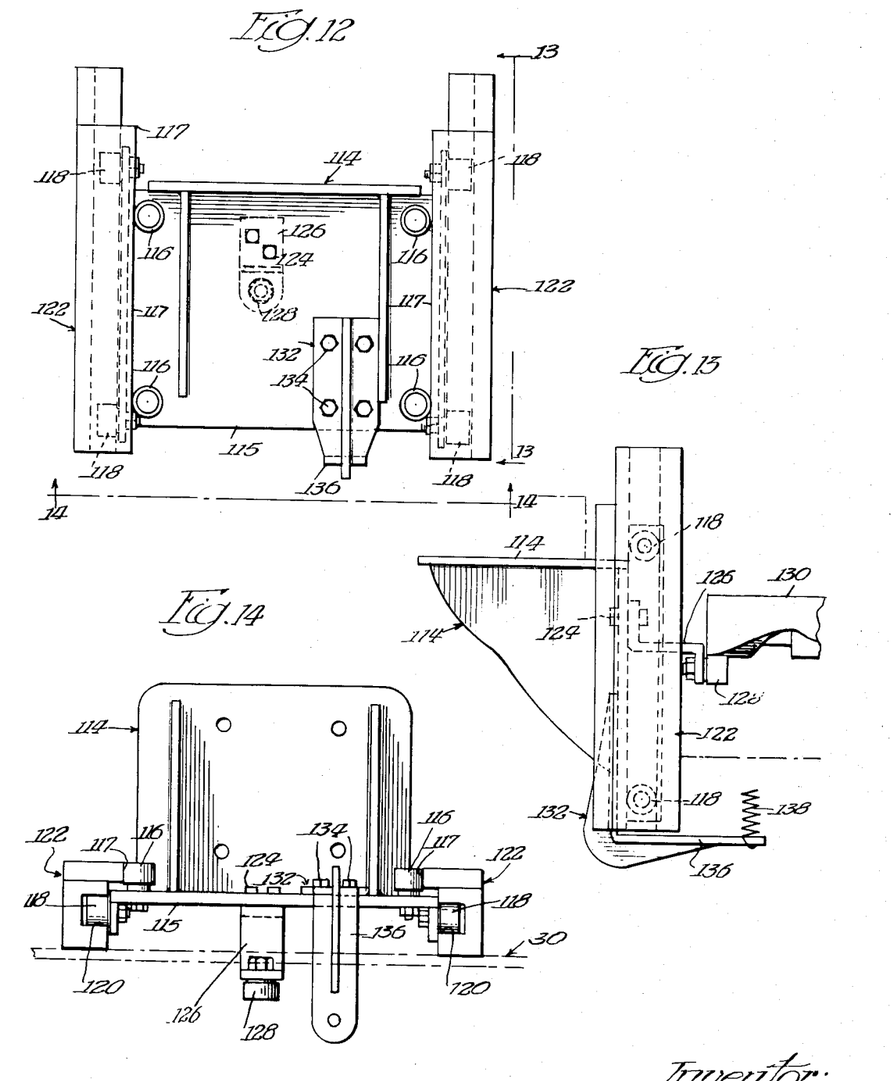
Fig. 12 is an enlarged plan view of the reciprocating chuck slide shown on a smaller scale in Fig. 1.
Fig. 13 is a view taken along the line 13—13 of Figure 12.
Fig. 14 is a view taken along the line 14—14 of Figure 12.
Figures 15, 17, 18, 19, 20:
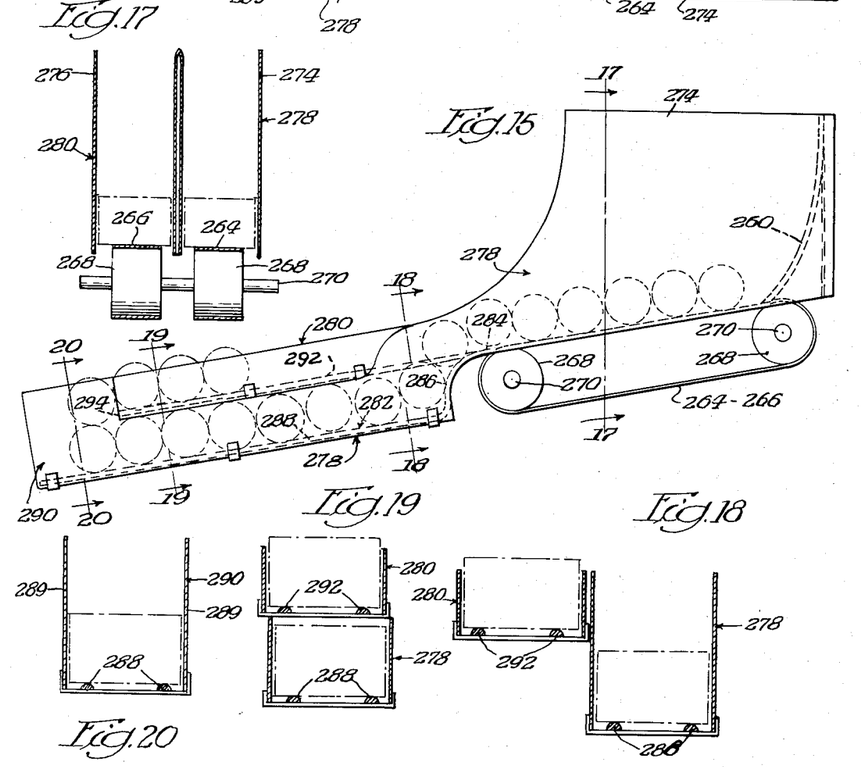
Fig. 15 is a side view of one type of discharge mechanism.
Figs. 17, 18, 19 and 20 are sectional views taken along the lines 17—17, 18—18, 19—19 and 20—20, respectively, of Fig. 15.
Figure 16:
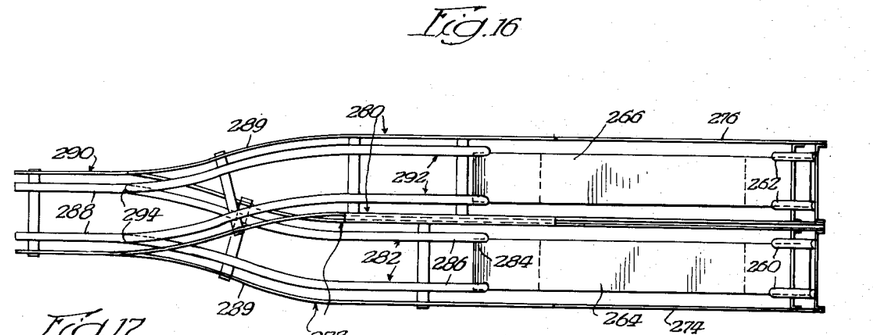
Fig. 16 is a plan view of Fig. 15.

A reciprocating electro-magnetic chuck 106 is provided, including an upright casing 107 in which are secured electro-magnets 108 having cores 109 projecting through perforations 110 in the non-magnetic face plate 111 of the casing, the cores terminating flush with the exposed surface of the plate. The magnets 108 are arranged in exactly the manner as the magnets 102 both as to number and as to polarity sequence. The casing 107 is bolted at 113 to a bracket 114 (Figs. 12, 13 and 14) having a base 115 marginally carrying guiding rollers 116 mounted on vertical axes and riding along guideway tracks 117, and additional rollers 118 mounted on parallel horizontal axes and riding on tracks 120, all of said tracks being located on parallel rails 122 fixed to the top 31 of the stand 30. Fixed at 124 to the bottom of the base 115 is a bracket 126 carrying a cam follower roller 128 (Figs. 12, 13 and 14) retracted by a rotary face cam 130 (Figs. 2, 3, 5 and 11). A bracket 132 fastened at 134 to the base 115 has a depending arm 136 to which an end of a spring 138 is anchored, the other end of the spring being anchored to a stationary bracket 140 (Fig. 2) depending from the stand top 31. Thus the cam 130 actuates the follower 128 to shift the magnetic chuck 106 to the left (i. e., away from the swinging chuck 97) and the spring 138 causes the follower to continue in contact with the cam to shift said chuck 106 to the right (i. e., toward the swinging chuck). When the chuck 106 is in an intermediate position (Fig. 2) where it remains during the dropping of the cans, as will appear, its face plate 111 is adjacent and flush with plates 77.

Figure 4:
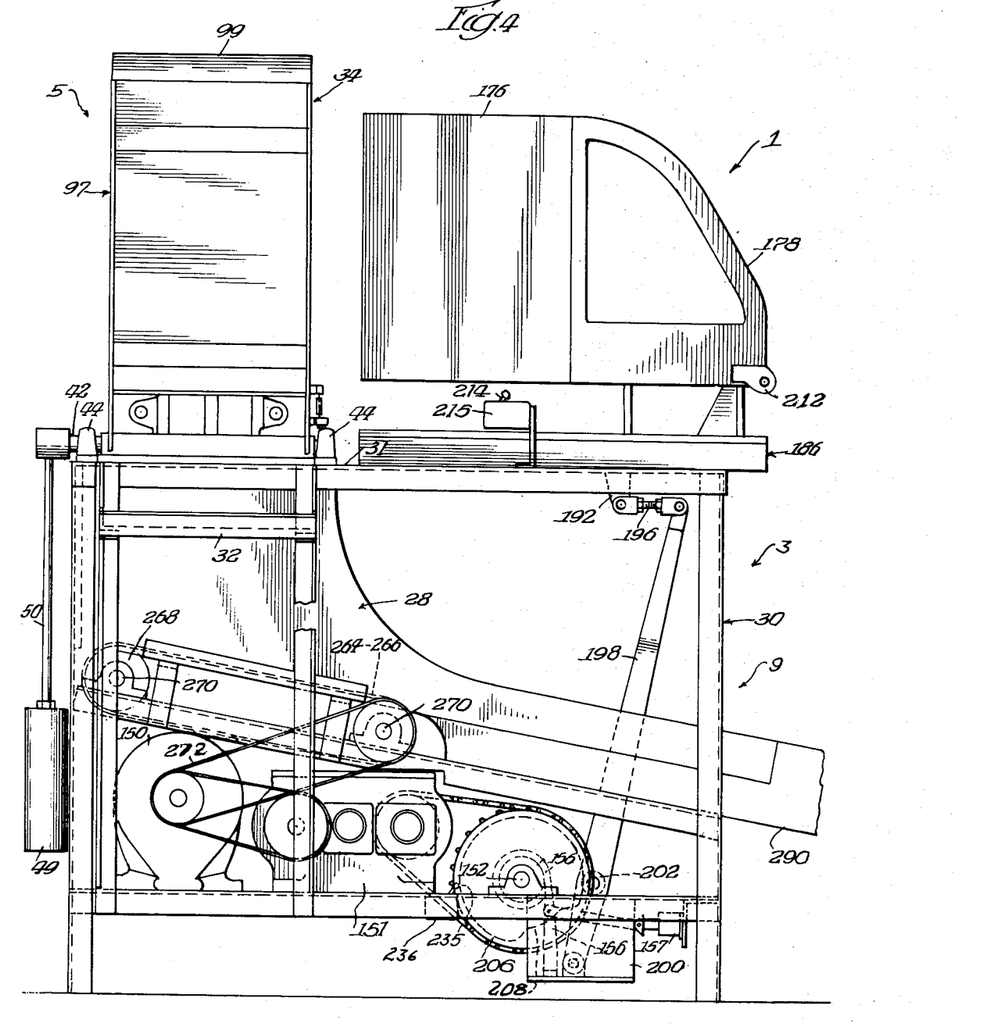
Fig. 4 is a right elevational view of the machine.
Figure 26:
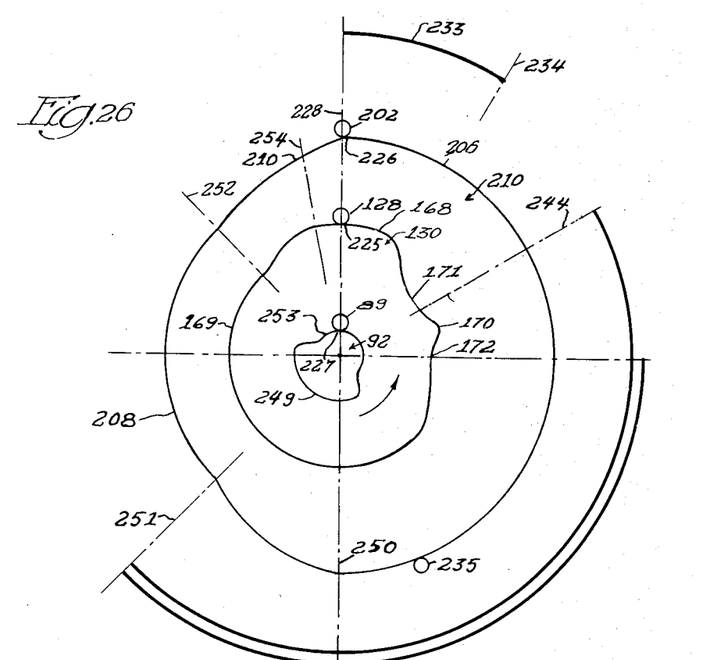
Fig. 26 is a diagram illustrating the sequence and timing of and positions occupied by various parts of the machine during a complete revolution of the drive shaft.

A motor 150 (Figs. 2, 3 and 4) is mounted on the sub-structure of the stand 30 and operates through a gear reduction mechanism 151 to drive a shaft 152, between which and said mechanism a pin type single revolution clutch 154 is provided, under the control of a clutch knife 156 controlled by a solenoid 157. The drive shaft 152 carries a sprocket 158 operating through a chain 160 to drive an identical sprocket 162 with which moves the rotary cam 130, keyed to a shaft 164 journaled in a bearing 166. The cam 130 has a plateau 168, a long intermediate crest 169, a short intermediate crest 170, a valley 171 between the plateau and the short crest, and a valley 172 between the long intermediate crest and the short intermediate crest (Figs. 11 and 26). It will be noted that when the cam follower 128 is engaged with one of the valleys, the reciprocating magnetic chuck 106 is at its closest to the swinging chuck 97, that when the follower is engaged with one of the intermediate crests, the chuck 106 is in an intermediate position, and that when the follower is engaged with the plateau (Figs. 1 and 5), the chuck 106 is in its fully retracted position.

A reciprocable vertical dividing or partitioning plate 176 (Figs. 1, 3, 4 and 5) is parallel to the face plate 111 and lies in the plane of the guide plate 58, when the latter is vertical. The dividing plate is mounted on a bracket 178 having a base 180 carrying rollers 182, arranged with their axes vertical and engaging the tracks 184 of parallel ways or rails 186, said base carrying additional rollers 188 arranged with their axes horizontal and engaging tracks 190 on said rails. An arm 192 depends from the base 180 and through a slot 194 (Fig. 1) in the stand top 31 and is connected by a link 196 and a lever 198 (Figs. 2, 3, 4 and 5) to a bracket 200 carried by the stand 30. The lever 198 carries a cam follower roller 202 held by a spring 204 in engagement with the crest 206, valley 208 and intervening ramps of a dividing plate actuating rotary cam 210 fixed to the drive shaft 152. Thus the cam 210 controls the to-and-fro movement of the dividing plate 176. The dividing plate bracket 178 carries a cam 212 engageable with the lever 214 of a limit switch 215 (Figs. 1, 3 and 4) as the dividing plate reaches its foremost (i. e. operative) position to open the energizing circuits for the magnets 102 and 108 of the two chucks 97 and 106, as will appear.

The shaft 164 carries a sprocket 216 (Figs. 2, 3, 5 and 11) connected by a chain 217 with a like sprocket 218 fixed to a shaft 219 supported in a bearing 220 carried by the stand 30, said shaft 219 driving a bevel gear 221 meshing with a like bevel gear 222 driving a shaft 223 in a bearing 224 also carried by the stand. The cam 92 (Figs. 3, 10 and 11), controlling the can-supporting detents 64 and 66, is fixed to the shaft 223, and thus derives its motion from and rotates at the same speed as the drive shaft 152.

Figure 25:
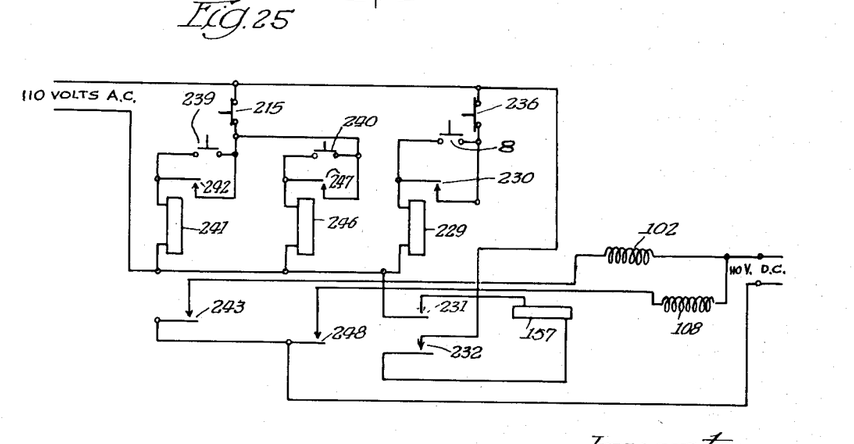
Fig. 25 is a circuit diagram of the electrical connections for the various parts of the machine.

The sequence and timing of operation and use of the machine, including a complete cycle of the drive shaft 152, will now be explained, and in this connection reference will be made to Figs. 25 and 26, among others.

Figure 1:
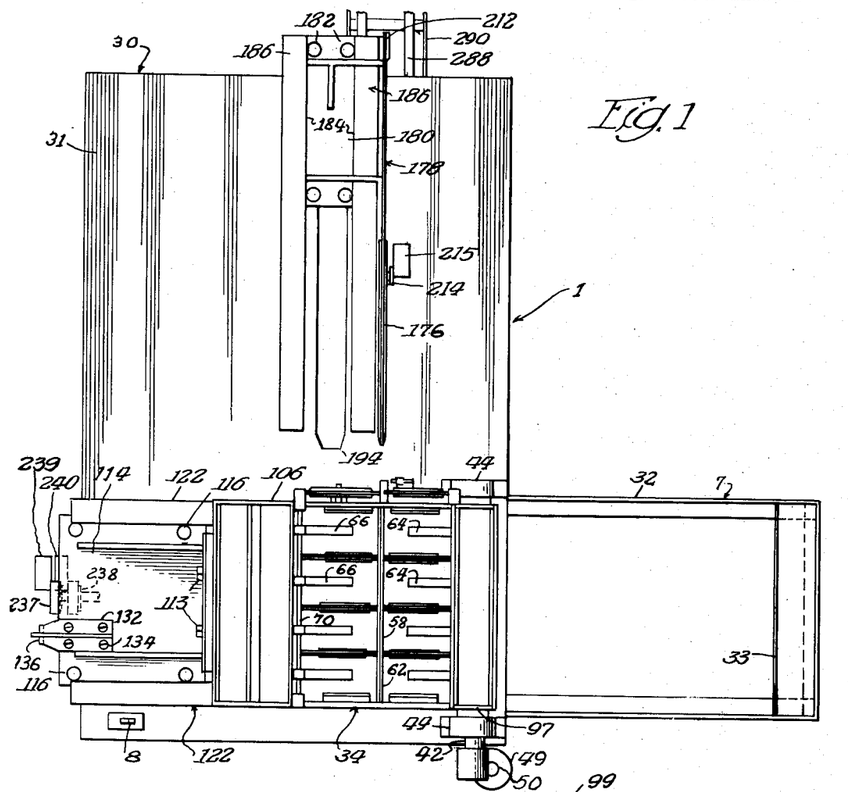
Fig. 1 is a plan view of a machine embodying features of the present invention, with the swinging chuck in vertical (unloading) position.
Figure 2:
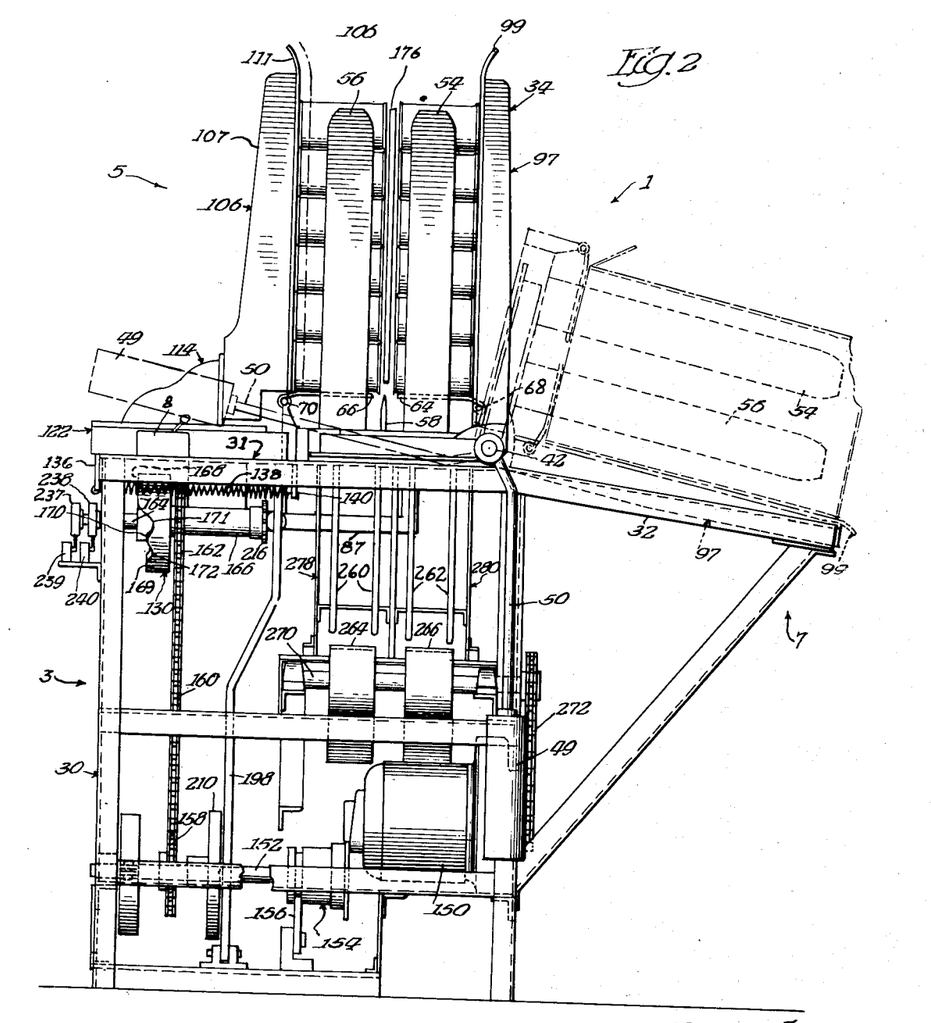
Fig. 2 is a front elevation of the machine showing also, in dot-dash lines, the swinging chuck in loading position.
Figure 3:
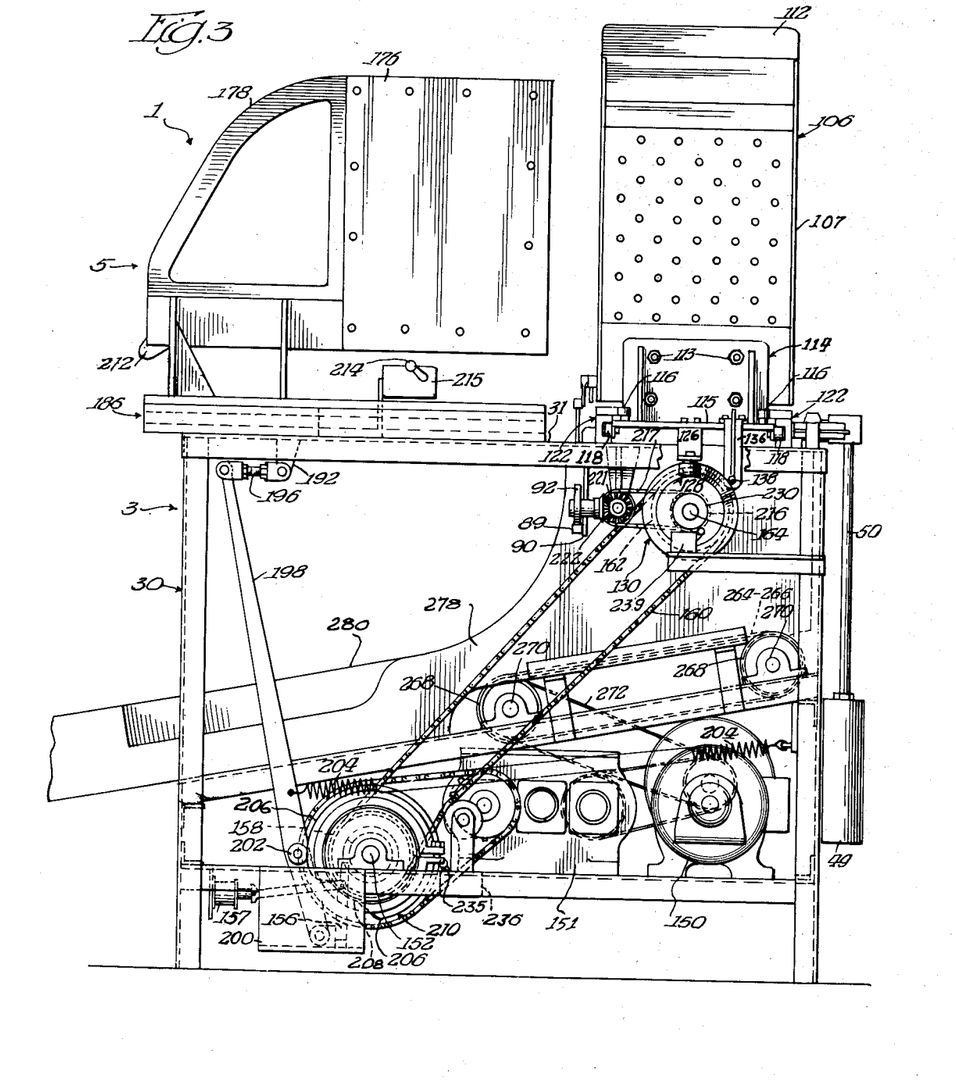
Fig. 3 is a left elevational view of the machine.

With the machine idle and the receiver 34 resting on the pad 33 on the table 32, the operator places the open end of a carton 35 of layers of empty cans in proper position on the lip 99 of the receiver and shoves the carton up along the receiver face plate 98 so that each longitudinal row of cans in one layer passes between adjacent receiver blades 54 and each longitudinal row of cans in the other layer passes between adjacent receiver blades 56. When the carton has been fully assembled with the receiver 34, the operator manually swings the receiver (with the carton 35) to its vertical position (Figs. 1 and 4 to 8) where, as previously noted, the receiver is held by the counter-weight 49. The operator then removes the carton, leaving the cans in the receiver, the cans being supported in vertical columns by the detents 64 and 66 and being located between the two magnetic chucks 97 and 106, whose magnets are not yet energized. The chuck 106 is in fully retracted position since its follower 128 is engaged with the plateau 168 of the cam 130 at the point 225 (Figs. 1, 5 and 26). The cans remain thus until the operator starts the cycle of machine operations by manually closing the starting switch 8 (Figs. 1 and 2). When this occurs, the follower 202 is in engagement with the crest 206 of the cam 210 at the point 226 (Fig. 26) and thus the reciprocating dividing plate 176 is in its fully retracted position, and the follower 89 is in engagement with the trough of the cam 92 (Fig. 10) at the point 227 and thus the detents 64 and 66 are held in can-supporting positions. The time of closing of the starting switch 8 is indicated by the line 228 in Fig. 26. The closing of the starting switch 8 completes a circuit (Fig. 25) to the operating winding of a clutch control relay 229, which is thereupon actuated and closes its contacts 230, 231 and 232. At its contacts 230, the relay 229 bypasses the starting switch 8 and establishes a maintaining or holding circuit for itself. At its contacts 231 and 232, the relay 229 closes a circuit for the clutch-actuating solenoid 157, which immediately becomes energized and actuates the clutch knife 156 to operate the clutch 154 and thereby establish a driving connection between the speed reducing unit 151 and the drive shaft 152. This starts rotation of the cams 92, 130 and 210 in the direction indicated by the arrow in Fig. 26. The duration of energization of the solenoid 157 is indicated by the line 233 (Fig. 26), the solenoid being de-energized at the point 234 pursuant to engagement of the follower arm 235 of a limit switch 236 (Fig. 3) with the crest 206 of the cam 210.

As the cam 130 rotates, the spring 138 causes the cam follower 128 to ride along the cam plateau 168 and then into engagement with the trough or valley 171 of the cam, thus moving the reciprocating chuck 106 throughout its full inward stroke, until it occupies the position shown in dot-dash lines in Fig. 2. This forces the layers of cans into mutual contact and into contact with the respective chucks 97 and 106. The shaft 164, with which the cam 130 rotates, carries switch cams 237 and 238 which operate in predetermined sequence to close electric limit switches 239 and 240, respectively (Figs. 1, 2 and 5). The limit switch 239 closes when the follower 128 engages the bottom of the cam valley 171, completing an electric circuit for a relay 241 which then closes its contacts 242 and 243. The contacts 242 shunt the limit switch 239 and thereby establish a holding circuit for the operating winding of the relay 241. The now-closed contacts 243 establish a circuit for the operating magnet coils 102 of the swinging magnetic chuck 97, which occurs when the drive shaft 152 has travelled to the extent indicated by the line 244 (Fig. 26).

The follower 128 then moves to the summit of the short intermediate crest 170, retracting the chuck 106 slightly free of the adjacent layer of cans. When the follower 128 reaches the bottom of the valley 172, the chuck 106 is again in its inmost position. The switch cam 238 now closes the limit switch 240, completing a circuit for the operating winding of a relay 246 which at its contacts 247 then establishes a holding circuit for itself and at its contacts 248 establishes an operating circuit for the magnet coils 108 of the reciprocating magnetic chuck 106. The two chucks 97 and 106 now hold the cans magnetically, one layer of cans being held by one chuck and the other layer of cans being held by the other chuck. As the cam 130 continues its rotation, the follower 128 progresses to the long intermediate crest 169, thus shifting the chuck 106 to an intermediate position (full lines, Fig. 2) where its face plate 111 is flush with the plates 77, the adjacent cans adhering to said chuck and thus a space of substantial width is afforded between the can layers.

When the chuck 97 is first swung to vertical position, and the carton removed, the beads at the open ends of some of the cans of one layer may be entangled with the adjacent beads of the closed ends of the cans of the other layer. Unless the layers of cans are separated they may, during discharge, become fouled with one another and not fall properly. It is to circumvent such a mishap that the magnetic chucks and the reciprocation of the chuck 106 are provided. Not only do the respective chucks 97 and 106 attract the respective layers of cans, but, as the chuck 106 is retracted, while magnetized, to its second intermediate position (full lines, Fig. 2), i. e., with the follower 128 in engagement with the crest 169 of the cam 130, the attraction of each chuck is sufficient to force any entangled beads of the cans to ride cam fashion over one another so that all of the cans of each layer will become separated from all of the cans of the other layer.

While the chuck 106 is approaching its second intermediate position and the cans are held magnetically by the two chucks 97 and 106, the follower 89 is approaching the crest 249 of the cam 92 and thus causing the detents 64 and 66 to swing down, so that, when the drive shaft 152 has progressed to the position indicated at 250, the withdrawal of the detents is completed, although the cans are still held magnetically by the chucks. As soon as the detents 64 and 66 are fully retracted, the follower 202 proceeds to descend toward the valley 208 of the cam 210, so that the dividing plate 176 moves into the space between the cam layers magnetically held by the chucks 97 and 106. The dividing plate 176 will prevent interference of the cans between the separating blades 54 with the cans between the separating blades 56 when the cans drop from the receiver 34. When the dividing plate 176 reaches the limit of its dividing movement, indicated at 251, the cam 212, carried by the bracket 173, completes actuation of the lever 214 of the normally closed limit switch 215, opening said switch and thus opening the holding circuits for the relays 241 and 246. The relays 241 and 246 drop back and thereby open the circuits for the magnet coils 102 and 108 of the swinging and reciprocating electro-magnetic chucks 97 and 106, respectively. This releases the cans, which immediately fall.

As the drive shaft 152 continues to rotate, the follower 128 runs along the elongated intermediate crest 169 and hence the de-magnetized chuck 106 remains stationary. The follower 202 runs along the elongated trough 208 of the cam 210 and hence the dividing plate 176 remains stationary. The follower 89 runs along the crest 249 of the cam 92, holding the detents 64 and 66 retracted while the cans are gravitating out of the receiver 34. By the time the drive shaft 152 reaches the position indicated at 252, sufficient time has transpired for all of the cans to have dropped completely out of the receiver 34, and for the follower 89 to have descended to the trough 253 of the cam 92 to return the detents 64 and 66 to their horizontal positions. As the drive shaft 152 continues to rotate from the position 252, the followers 128 and 202 ascend to the plateau 168 and crest 206, respectively, thus completely retracting the chuck 108 and dividing plate 176, said chuck reaching its fully retracted position when the shaft has turned to the point indicated at 254, and said plate reaching its fully retracted position when the shaft has returned to its starting point 228, whereupon the clutch 154, being of the single revolution pin type as above noted, automatically disconnects the shaft from the motor 150. In the meantime, the solenoid limit switch 236 has closed.

The machine is now at rest. The operator may swing the receiver 34 down to rest on the table 32 in position to receive another carton of empty cans at any time after the previous cans have left the receiver.

Rails 260 and 262 are arranged to receive the columns of cans to guide them forward onto inclined left and right belts 264 and 266, trained about pulleys 268 mounted on shafts 270, one of which is chain driven as indicated at 272 (Figs. 2 and 4) by the motor 150. The upper runs of the belts 264 and 266 are located at the bottoms of the mouths 274 and 276 of a pair of left and right chutes 278 and 280 in the front portions of which the rails 260 and 262 extend. Rails 282 are carried by the left chute 278 and have forward ends 284 in the plane of the upper run of the belt 264, whence said rails dip as shown at 286 and then continue at an incline as shown at 288 in a plane below the aforesaid plane a distance which preferably somewhat exceeds the diameter of the cans. The rear portions of the chutes 278 and 280 approach each other, although at different levels (Figs. 15 to 20), and their outer walls 289 merge into a single discharge terminal 290. Rails 292 carried by the right chute 280 extend from the forward end of and in the same plane as the upper run of the right belt 266, and terminate rearwardly at 294 directly over the rear portions 288 of the rails 282, which, it will be noted, are coterminous with the chute terminal 290.

The cans of the left layer fall on the left belt 264 and progress therefrom in sequence along the rails 282. The cans of the right layer fall on the right belt 266 and progress therefrom in sequence along the rails 292 and drop off the rail ends 294 and join the stream of cans on the rear portions 288 of the rails 282, whence all of the cans pass in a single sequence from the chute terminal 290 to a conveyor belt (not shown) leading to a canning line.

The chute structure just described is designed for use when the cans in the carton 35 are arranged with their open ends facing the same (top or bottom) wide panel of the carton, for, as will be noted from the foregoing, the open ends of all of the cans when discharged from the chute structure face in the same desired direction. However, as earlier noted, the open ends of all of the cans will, when discharged from this chute structure, face in the wrong direction if the operator is careless and does not place the carton with the proper wide panel of the carton facing the swinging chuck 97.

The chute modification of Figs. 21 to 24 is adapted for use with cartons in which the cans are so arranged that the open ends of the cans in the respective layers face in opposite directions. This chute delivers the cans to the canning line in a single sequence with their axes parallel and the open ends of all of the cans facing in the same direction. Manifestly, with such a chute structure, it is immaterial whether the operator places the carton on the receiver with the top side panel or with the bottom side panel facing the swinging chuck 97.

Figures 21, 22, 23, 24:
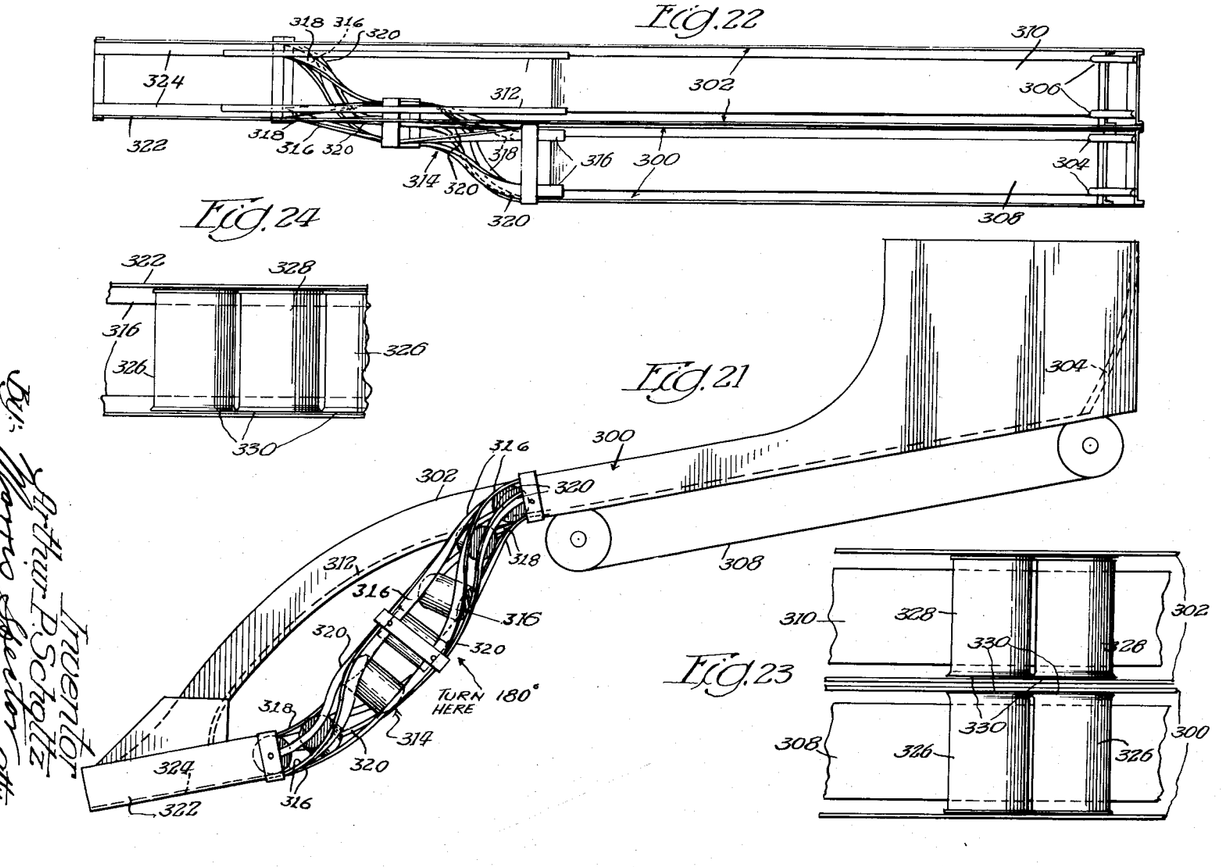
Fig. 21 is an elevational view of a modified discharge mechanism.
Fig. 22 is a plan view of the same.
Figs. 23 and 24 are enlargements of intermediate and terminal portions of the same.

The modified chute structure comprises left and right chutes 300 and 302 in whose mouths extend left and right downwardly and rearwardly curved can-guiding rails 304 and 306 leading to the forward ends of the rearwardly and downwardly inclined upper runs of left and right belts 308 and 310 extending along the bottoms of the forward portions of the chutes. The right chute 302 has rails 312 in the same plane as and extending from the rear end of the upper run of the belt 310 to points somewhat short of the rear (discharge) end of that chute. Rearward beyond the belt 308, the left chute 300 is provided with a can-reversing structure 314 which may take any suitable form and is here shown as comprising two pairs of can bead guide rails 316 and 318 and an intermediate pair of can end guide rails 320. The rails 316 are at the top and the rails 318 are at the bottom at the can-receiving end of the reversing mechanism, which is the upper end as seen in Figure 21. The can end guideways 316, 318 and 320 are all parallel to one another and twisted through 180° and connected rearwardly to a discharge chute terminal 322 to the upper part of which the rails 312 lead. The cans dropping off the rails 312 join the stream of cans on the rear extensions 324 of the twisted rails 316, whence all of the cans pass in a single sequence to a conveyor belt (not shown) leading to a canning line. It will be noted that while the cans 326 and 328 are traveling on the belts 308 and 310, respectively, the open ends 330 of the cans are mutually facing (Fig. 23), as they were arranged in the carton, and that the left layer of cans 326 is reversed by the structure 314 so that when the cans are in the discharge terminal 322 the open ends of all of the cans face the left side of the terminal.

It is obvious that if cartons were packed with empty cans whose closed ends were mutually facing, and it were still desired to have the open ends of the cans face to the left as the cans leave the machine, it would be necessary merely to reverse the positions and roles of the chutes 300 and 302 to accomplish the desired result.

The machine, of course, is also adapted to operate with a carton containing a single layer of cans. In such event the carton of cans is loaded by the operator onto the receiver 34 with the proper wide panel of the carton facing the swinging chuck 97. The same steps could then ensue as with a double-layer of cans, except, of course, that the need for the magnets is obviated and hence, if desired, the magnet-controlling switches may be rendered inoperative, i. e., held continuously open by suitable means.

While I have herein spoken of the clutch as being one of the type which, upon energization of its solenoid, remains in clutch-engaging position even after de-energization of its solenoid until the mechanism has made one complete revolution, it is within the purview of the present invention to use an ordinary electro-magnetic clutch of the type wherein the clutch is in its actuated position only so long as the clutch-actuating solenoid is energized. When this is the case it is merely necessary to provide for de-energization of the clutch-actuating relay 229 (Fig. 25) at the end of the cycle, that is, to provide for opening of the limit switch 236 at the end of the cycle instead of after completion of about 1/12 of the cycle.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A machine for receiving a group of empty open cans and delivering the cans one by one, said machine including a can-receiving unit having means to segregate the cans into columns, can-supporting means at the base of each column, said unit also including a can-holding chuck which constitutes a wall of said unit, a second can-holding chuck parallel to the first mentioned chuck, and means for shifting said chucks towards and from one another to bring the cans into proper positions.

2. A machine for receiving a group of empty open cans and delivering the cans one by one, said machine including a can-receiving unit having means to segregate the cans into columns, can-supporting means at the base of each column, said unit also including a can-holding chuck which constitutes a wall of said unit, a second can-holding chuck parallel to the first mentioned chuck, means for shifting said chucks towards and from one another to bring the cans into proper positions, and remote controlled means for thereafter causing the chucks to grip the cans.

3. A machine for receiving a group of empty open cans and delivering the cans one by one, said machine including a can-receiving unit having means to segregate the cans into columns, can-supporting means at the base of each column, said unit also including a can-holding chuck which constitutes a wall of said unit, a second can-holding chuck parallel to the first mentioned chuck, means for shifting said chucks towards and from one another to bring the cans into proper positions, remote controlled means for thereafter causing the chucks to grip the cans, and means for releasing the can supporting means and for releasing the hold of the chucks on the cans.

4. A machine for receiving two contacting groups of empty open cans with the cans of the two groups facing in opposite directions and delivering the cans in sequence with the open ends of the cans facing in the same direction, said machine including a can-receiving unit having means to segregate the cans of each group into columns, can-supporting means at the base of each column, said unit also including a can-holding chuck which constitutes a wall of said unit confining one group of cans, a second can-holding chuck parallel to the first mentioned chuck and confining the second group of cans, means for shifting said chucks towards and from one another to bring the cans into proper positions, remote controlled means for thereafter causing the chucks to grip the cans and separate the two groups of cans, means for releasing the can-supporting means and releasing the hold of the chucks on the cans to permit the cans to drop, means for reversing each of the cans of one of the groups of cans with respect to the cans of the other group so that all the cans face in the same direction, and means for combining the cans of the two groups.

5. A machine for receiving a group of empty open cans and delivering the cans one by one, said machine comprising a support, a can-receiving unit on said support, said unit having a base from which extend two series of parallel blades, the end blades of each series being adapted to confine the cans, and the intermediate blades being adapted to enter between the cans to segregate the cans into columns, said unit including detents adjacent said base, said blades and detents supporting said cans in vertical columns, said unit also including a can-holding chuck which constitutes a wall of said unit, a second can-holding chuck parallel to the first mentioned chuck, and means for shifting said chucks towards and from one another to bring the cans into proper positions.

6. A machine for receiving a group of empty open cans and delivering the cans one by one, said machine comprising a support, a can-receiving unit on said support, said unit having a base from which extend two series of parallel blades, the end blades of each series being adapted to confine the cans, and the intermediate blades being adapted to enter between the cans to segregate the cans into columns, said unit including detents adjacent said base, said blades and detents supporting said cans in vertical columns, said unit also including a can-holding chuck which constitutes a wall of said unit, a second can-holding chuck parallel to the first mentioned chuck, means for shifting said chucks towards and from one another to bring the cans into proper positions, and remote controlled means for thereafter causing the chucks to grip the cans.

7. A machine for receiving a group of empty open cans and delivering the cans one by one, said machine comprising a support, a can-receiving unit on said support, said unit having a base from which extend two series of parallel blades, the end blades of each series being adapted to confine the cans, and the intermediate blades being adapted to enter between the cans to segregate the cans into columns, said unit including detents adjacent said base, said blades and detents supporting said cans in vertical columns, said unit also including a can-holding chuck which constitutes a wall of said unit, a second can-holding chuck parallel to the first mentioned chuck, means for shifting said chucks towards and from one another to bring the cans into proper positions, remote controlled means for thereafter causing the chucks to grip the cans, and means for releasing the detents and for releasing the hold of the chucks on the cans to permit the cans to drop.

8. A machine for receiving an open-ended carton of empty open cans arranged in two layers with the open ends of one layer facing in one direction and the open ends of the other layer facing the opposite direction and delivering the cans with the open ends of all of the cans facing in one direction, said machine comprising a stand, a can-receiving device movably mounted on said stand and adapted in one position to telescope with the carton open end first, said device being movable to a can-discharging position in which the open end of the carton is lowermost, can-supporting detents on said device for supporting the cans independently of the carton when said device is in can-discharging position permitting removal of the carton, magnetic means for separating the layers of cans when the carton is removed from said device, means for releasing said magnetic means and detents, leaving the cans free to fall, means for receiving and guiding the falling cans in two paths, one for each layer of cans, and can-reversing means arranged to receive the cans from only one of the paths and merging the stream of reversed cans with the stream of cans in said other path so that all of the cans are discharged with their open ends facing in one direction.

9. A machine for receiving an open-ended carton of empty open cans arranged in two layers with the open ends of one layer facing one side panel of the carton and the open ends of the other layer facing the opposite side panel of the carton and discharging the cans in a single sequence with the open ends of all of the cans facing in one direction, said machine comprising a support, a can-receiving unit movably mounted on said support and manually movable to a position to telescope with the can-filled carton open end first, said unit including means operative when said device is vertical for supporting the cans in rows longitudinally of the carton, said means including detents for engaging an end of each row at the open end of the carton, can-holding devices independent of said detents and engageable with the respective layers of cans, means for relatively moving said devices so as to separate the respective layers of cans, means for shifting said detents to inoperative positions, means for disengaging said devices from the cans, leaving the cans free to fall, belts for conveying the falling cans in separate sequences, a chute arranged to receive and discharge the cans of one sequence, and can-reversing means arranged to receive the other sequence and discharge the same into said chute so as to merge the sequence with the open ends of all of the cans facing in one direction.

10. A machine for receiving an open-ended carton of empty open cans arranged in two layers with the axes of all of the cans normal to the ends of the carton and automatically delivering the cans in a single sequence with the open ends of the cans in alignment, said machine comprising a support, a receiver unit mounted on said support and adapted to contain the contents of the carton, said unit having means for maintaining the cans in vertical rows in the same relationship as in the carton when the carton's sides are vertical, said means including movably mounted detents adapted in one position to engage the bottoms of the rows of cans, said unit including a chuck adapted to hold all of the cans of one layer, a chuck mounted on said support and facing the first chuck and adapted to hold all of the cans of the other layer, means for effecting relative movement of said chucks to engage said chucks with the cans, means for effecting opposite relative movement of said chucks to separate said can layers, means for releasing said cans from the chucks, means for moving said detents to inoperative positions, leaving the cans free to gravitate from said unit, and means for returning said detents to operative position.

11. A machine for receiving an open-ended carton of empty open cans arranged in two layers with the axes of all of the cans normal to the ends of the carton and automatically delivering the cans in a single sequence with the open ends of the cans in alignment, said machine comprising a support, a receiver unit mounted on said support and adapted to contain the contents of the carton, said unit having means for maintaining the cans in vertical rows in the same relationship as in the carton when the carton's sides are vertical, said means including movably mounted detents adapted in one position to engage the bottoms of the rows of cans, said unit including a chuck adapted to hold all of the cans of one layer, a chuck mounted on said support and facing the first chuck and adapted to hold all of the cans of the other layer, means for effecting relative movement of said chucks to engage said chucks with the cans, means for effecting opposite relative movement of said chucks to separate said can layers, a divider plate movably mounted on said support, means for moving said plate into the space between the can layers, means for releasing said cans from the chucks, means for moving said detents to inoperative positions, leaving the cans free to gravitate from said unit, and means for returning said divider plate to inoperative position and said detents to operative position.

12. In a machine for receiving an open-ended carton of parallel empty open cans arranged in layers and delivering the cans in sequence with the open ends of all of the cans in alignment, a device for telescoping with a can-filled carton open end first and discharging the cans for subsequent routing through the machine, said device comprising a rectangular base frame, a rectangular face plate extending from a side of and normal to the plane of said frame and of a size to engage the entire surface of a carton panel normal to the axes of the cans, two straight spaced series of parallel blades each of a width substantially less than can length and substantially coterminous with said face plate and extending in front of said face plate from the interior of said frame, the blades of each series being co-planar with the respective blades of the other series, the planes of said blades being normal to said face plate, said series being so spaced relative to said face plate that as the carton is assembled with said device, with the aforesaid carton panel adjacent said face plate, the several rows of cans pass between the several blades and are thereby segregated, with the blades engaging the sides of the cans between the beads of each can, rows of detents movably mounted respectively on said side and on the opposite side of said frame adjacent said frame and arranged in operative position to engage the bottoms of the rows of cans to support the cans when said face plate is vertical, means for separating the layers of cans, means for moving said detents to inoperative position to allow the cans to gravitate from said device, and a guide plate connected to said frame below the operative position of said detents and in a plane parallel to said face plate and arranged so that the layers of cans gravitate at opposite faces of said guide plate.

13. A machine for receiving an open-ended carton of empty open cans arranged in two layers with their open ends facing the same side panel of the carton and discharging the cans in a single sequence with the open ends of the cans facing in one direction, said machine comprising a stand, a can-receiving unit pivoted to said stand, means limiting swinging movement of said unit between a vertical can-discharging position and a position at which it can telescopically receive the upper open end of the can-filled carton, said unit having means for separating the cans of each layer into spaced rows longitudinally of the carton as the carton is moved onto said unit, means on said unit for engaging the sides of the cans at the open end of the carton whereby, when said unit is vertical, the last mentioned means prevents gravitation of the several rows of cans, said unit including a magnetic chuck facing the cans of one layer, a vertical magnetic chuck mounted on said stand and facing the cans of the other layer, means operable after removal of the carton for energizing said chucks while said unit is vertical, whereby the cans in one layer are held by one chuck and the cans of the other layer are held by the other chuck, means for moving one of said chucks away from the other chuck, leaving a space throughout between the two layers of cans, a divider plate movably mounted on said stand, means for shifting said divider plate into the space between said layers after the carton has been removed from said unit, means for moving the can row supporting means to inoperative position, means for thereafter de-energizing said chucks, leaving the cans free to fall, means arranged to receive the cans of the respective layers and convey them in separate sequences, and means for converging the sequences into a single sequence with all the open ends of the cans facing in one direction.

14. A machine for receiving an open-ended carton of empty open cans arranged in two layers and delivering the cans in sequence with the open ends of the cans facing in the same direction, said machine comprising a support, a can-receiving unit pivoted to said support, means limiting swinging movement of said unit between a can-discharging position and a can-receiving position at which it can receive the open end of the can-filled carton, said unit having a base from which extend two series of parallel blades, the end blades of said series being adapted to enter the carton and straddle the can layers between the ends of the cans, and the intermediate blades being adapted to enter between the several rows of cans between the ends of the cans to segregate the rows of cans into columns, as the carton is moved onto said unit, said unit including detents adjacent said base arranged to engage the sides of the cans at the open end of the carton when the carton is assembled with said unit, said blades and detents supporting said cans in columns when said unit is in its discharging position, said unit also including an electro-magnetic chuck next which a wall of the carton normal to the axes of the cans is disposed when the carton is assembled with said unit, an electro-magnetic chuck reciprocally mounted on said stand and extending parallel to the first mentioned chuck when said unit is vertical, means for shifting said reciprocating chuck toward said swinging chuck sufficiently to force the cans of each layer into end-to-end engagement with the cans of the other layer and into end engagement with the respective chucks, means for energizing said swinging chuck so as to magnetically hold the adjacent layer of cans, means for thereafter retracting said reciprocating chuck and then moving it into substantial engagement with the other layer of cans, means for energizing said reciprocating chuck whereby said other layer of cans is magnetically held by said reciprocating chuck, means for retracting said reciprocating chuck without de-energizing the same, whereby a space is left throughout between the two layers of cans, a vertical divider plate reciprocally mounted on said support, a guide plate carried by said unit adjacent said detents when said detents are in can-supporting positions and disposed in the plane of said divider plate when said swinging chuck is vertical, means for moving said divider plate into the space between said layers when the carton is removed, means for moving said detents out of their can-supporting positions, means for de-energizing said magnets, leaving the cans free to fall, one layer at each side of the plane of said plates, means arranged side by side to receive the cans of each layer and convey them in separate sequences, and means for converging the cans into a single sequence with the open ends of the cans facing in the same direction.

15. A can removing device, which comprises a table pivotal between a horizontal position and a vertical position, a plurality of bars fixed to the table in parallel positions in which the bars extend from the table in directions transverse to the table, a plurality of blades mounted on the bars in parallel positions facing one another and spaced from and extending along the table, said blades being designed to separate cans into rows and separate the outermost rows of cans and a carton enclosing the cans when the carton is slid over the blades, and means for supporting the rows of cans when the table is moved to its vertical position, said can removing device including a plurality of electromagnets mounted on the table for attracting the cans to the table to orient the cans.

References Cited in the file of this patent

UNITED STATES PATENTS

| Number | Name | Date |
|---|---|---|
| 843,056 | Young | Feb. 5, 1907 |
| 1,439,550 | Hunter et al. | Dec. 19, 1922 |
| 1,639,487 | Collis | Aug. 16, 1927 |
| 1,802,629 | Copeland | Apr. 28, 1931 |
| 1,925,677 | Richardson et al. | Sept. 5, 1933 |
| 2,337,033 | Davies | Dec. 21, 1943 |
| 2,410,163 | Howard | Oct. 29, 1946 |
| 2,511,266 | Hube et al. | June 13, 1950 |
| 2,541,809 | Clark | Feb. 13, 1951 |